United States Patent

Brosius et al.

[11] Patent Number: 5,124,240
[45] Date of Patent: Jun. 23, 1992

[54] OPTICAL RECORDING MEDIUM

[76] Inventors: Sibylle Brosius, 29 Cordovastrasse, 6700 Ludwigshafen; Bernhard Albert, 13 Rietburgstrasse, 6701 Maxdorf; Michael Schmitt, 18 Freudenbergstrasse, 6940 Weinheim; Klaus D. Schomann, 47 Kopernikusstrasse, 6700 Ludwigshafen; Harald Kuppelmaier, In den Bannzaeunen, 6701 Goennheim; Ulrich Harten, 15 Berthold-Schwarz-Strasse, 6700 Ludwigshafen, all of Fed. Rep. of Germany

[21] Appl. No.: 494,470

[22] Filed: Mar. 16, 1990

[30] Foreign Application Priority Data

Apr. 11, 1989 [DE] Fed. Rep. of Germany ....... 3911829

[51] Int. Cl.⁵ ................. G03C 1/00; C08F 10/00; C08G 61/00
[52] U.S. Cl. ................... 430/495; 430/270; 430/945; 526/280; 526/284; 528/396
[58] Field of Search ............. 430/495, 945, 270; 526/280, 284; 528/396

[56] References Cited

U.S. PATENT DOCUMENTS

| | | | |
|---|---|---|---|
| 3,637,581 | 1/1972 | Horiguchi et al. | 260/41.5 |
| 4,097,895 | 6/1978 | Spong | 358/128 |
| 4,139,853 | 2/1979 | Ghekiere et al. | 430/290 |
| 4,380,769 | 4/1983 | Thomas et al. | 346/135.1 |
| 4,529,688 | 7/1985 | Law et al. | 430/495 |
| 4,702,945 | 10/1987 | Etzbach et al. | 428/1 |
| 4,707,430 | 11/1987 | Ozawa et al. | 430/495 |
| 4,814,256 | 3/1989 | Aldag et al. | 430/495 |

FOREIGN PATENT DOCUMENTS

| | | |
|---|---|---|
| 0155780 | 3/1985 | European Pat. Off. . |
| 0186404 | 7/1986 | European Pat. Off. . |
| 0191215 | 8/1986 | European Pat. Off. . |
| 0200833 | 11/1986 | European Pat. Off. . |
| 0204876 | 12/1986 | European Pat. Off. . |
| 0213923 | 3/1987 | European Pat. Off. . |
| 864275 | 3/1961 | United Kingdom . |

OTHER PUBLICATIONS

G. N. Schrauzer, Advan. Organometal, Chem., 2, 1 (1968).
A. Kuroiwa et al., Jap. J. of Appl. Phys., 22, 340 (1983).
A. Ledwith et al., Macromolecular Synth., 6, 19 (1977).

Primary Examiner—Charles L. Bowers, Jr.
Assistant Examiner—Ashley I. Pezzner

[57] ABSTRACT

An optical recording medium consists essentially of a base material and a light-absorbing layer which contains a thermoplastic binder and at least one dye, wherein the thermoplastic binder is a polycyclic hydrocarbon which has a glass transition temperature $T_g$ of greater than 150° C. and is soluble to more than 3% by weight in an aliphatic or aromatic hydrocarbon.

3 Claims, No Drawings

OPTICAL RECORDING MEDIUM

The present invention relates to an optical recording medium consisting essentially of a base material and a light-absorbing layer which contains a thermoplastic binder and at least one dye.

Recording media which store information through local changes in the optical properties of the medium are known. The changes to the parts of the recording element which are intended for recording are thermally initiated with radiation of high energy density, for example laser light, and can take the form of a local vaporization of material, a change in shape or surface structure of the recording layer due to softening, a discoloring or bleaching of a dye, or else a change in the physical structure of the material, thereby bringing about a change in the optical properties, for example the absorption or absorbance, of the recording element, which is subsequently redetectable with suitable equipment and processible as stored information.

Existing optical recording media consist of a base material made of glass or a suitable plastic, for example polycarbonate, atop of which thin layers of inorganic material, for example metals, semimetals or alloys, or organic compounds, for example dyes, have been applied. These thin layers are predominantly produced by vacuum vapor deposition or by sputtering. However, the thickness of the layer must be such that maximum reflection takes place.

To operate with the near infrared solid state injection lasers predominantly used, the organic dyes described are in particular phthalocyanine compounds, methine dyes and squaric acid derivatives. Azo dye complexes, anthraquinone and triphenylmethane dyes and also pyrylium and thiopyrylium salts have likewise been described, but are of only limited usefulness since their absorption maxima are in most cases too much on the short wavelength side for existing semiconductor lasers. This problem does not arise with dithiolene complexes, of which a large number are known (for example G. N. Schrauzer, Acc. Chem. Res. 2, (1969), 72–80) and the use of which in optical recording media has been described.

U.S. Pat. No. 4,097,895 describes a recording medium comprising a layer of a light-reflecting material, for example aluminum or gold, and a light-absorbing layer, for example fluoreszein. This recording medium can be operated using the beam of an argon laser. The thickness of the light-absorbing layer is made such that the structure possesses minimum reflectivity. An incident light beam lifts the absorbing layer off and vaporizes or melts it, forming a hole and baring the light-reflecting layer. After recording, there is a difference for the wavelength of the light used for recording between the minimum reflectivity of the light-absorbing layer and the higher reflectivity of the light-reflecting layer. If the light-reflecting material has been applied as a thin layer atop a substrate of only low heat conductivity, the energy loss is very small not only because of the minimal reflection at the thin absorbing layer but also because of the poor heat conductivity of the reflecting layer. The energy absorbed from the light beam is thus concentrated on the very thin film.

However, it is a general rule that the application of the light-absorbing dye layers by vacuum vapor deposition or by sputtering is not only complicated but also difficult to make reproducible, since the dye must be present in a smooth layer of high optical quality in a thickness sufficient for the sensitivity of the recording medium and, what is more, such dye layers are mechanically too soft and also tend to crystallize.

To improve the layer quality and to increase the sensitivity or reduce the noise, it has also been proposed to apply the light-absorbing dye within a layer-forming polymeric binder. U.S. Pat. No. 4,380,769 discloses argon laser writable recording media which contain azo dyes and/or coumarin compounds in a polymeric binder as light-absorbing layer. The use of dyes in conjunction with styrene oligomers is described by Kuroiwa in Jap. J. Appl. Phys. 22 (1983), 340–43. Said paper also refers to the difficulties of such a combination in light-absorbing layers due to phase separation and the incompatibility between dye and oligomer. In addition, both U.S. Pat. No. 3,637,581 and U.S. Pat. No. 200,833 inter alia suggest eliminating the aforementioned disadvantages by a chemical bond between the chromophore and the polymer. However, such a measure is unsuitable for many fields, since only a small selection of dyes come into consideration for this purpose and these dyes, what is more, do not produce the best possible light-absorbing layers.

In summary it follows that the use in the storage layers of optical recording media of specific dyes which are particularly suitable on account of their excellent absorbing properties presents problems in particular as regards the application of optically uniform and stable layers. There may be mentioned in particular the crystallization in pure dye layers but also in incompatible dye/binder layers. Similarly, the addition of these dyes to layer-forming polymers presents difficulties due to the limited solubility of the components and/or eventual phase separation. It is also customary to apply the light-absorbing layer to the base materials, which are usually made of polycarbonate, by spin coating, so that, among others, aliphatic hydrocarbons come into consideration for use as solvents. However, most of the film formers widely used for this purpose are insoluble in aliphatic hydrocarbons.

It is an object of the present invention to provide optical recording media whose light-absorbing layer consists of a soluble mixture of a dye and a polymer, which polymer permits the formation of thicker layers and should suppress crystallization and increase the mechanical stability.

We have found that this object is achieved by an optical recording medium consisting essentially of a base material and a light-absorbing layer which contains a thermoplastic binder and at least one dye, wherein the thermoplastic binder is a polycyclic hydrocarbon which has a glass transition temperature Tg of greater than 150° C. and is soluble to more than 3% by weight in an aliphatic or aromatic hydrocarbon.

Of particular advantage are polycyclic hydrocarbons consisting to an extent of more than 80%, in particular more than 90%, of units of the general formula I

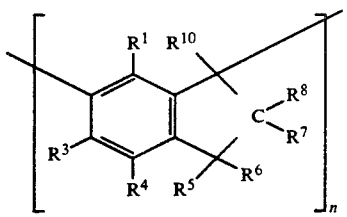

where n is an integer from 10 to 1,000, in particular from 10 to 100, and $R^1$, $R^3$, $R^4$, $R^5$, $R^6$, $R^7$, $R^8$ and $R^{10}$ are each independently of the others hydrogen or $C_1$–$C_3$-alkyl.

In an advantageous embodiment of the optical recording media according to the invention, the polycyclic hydrocarbon is composed to an extent of more than 80%, in particular more than 90%, of units of the general formula II

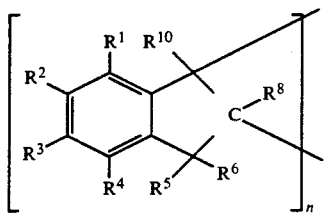

where n is an integer from 10 to 1,000, in particular from 10 to 100, and $R^1$, $R^2$, $R^3$, $R^4$, $R^5$, $R^6$, $R^8$ and $R^{10}$ are each independently of the others hydrogen or $C_1$–$C_3$-alkyl.

A further advantageous embodiment arises if, in the general formula II, n is an integer from 10 to 1,000, in particular from 10 to 100, $R^1$, $R^2$, $R^3$, $R^8$ and $R^{10}$ are each independently of the others hydrogen or $C_1$–$C_3$-alkyl, and $R^4$ is (—CH=CH—CH=) which is bonded to the five-membered ring by the terminal double bond in place of $R^5$ and $R^6$.

The above-defined polycyclic hydrocarbons are prepared by cationic polymerization as described inter alia by U. R. Sorensen and T. W. Campbell in Preparative Methods in Polymer Chemistry, pages 193–194, John Wiley and Sons; GB-B-864 275; or by A. Ledwith, D. C. Sherrington, Macromolecular Synthesis 6 (1977), 19–21.

The dyes for the light-absorbing layer can be the conventional IR dyes. They can predominantly be from the class of the azulenesquaric acid dyes as described in DE-A-3 733 173, the cyanine dyes as described in DE-A-3 533 772, 3 608 214, 3 738 911 and 3 810 642, the phthalocyanine and naphthalocyanine dyes as described for example in DE-A-3 446 418 and 3 520 109, and EP-A-155 780, 186 404, 191 215, 204 876 and 213 923, the dithiolene dyes as described in DE-A-3 505 751, the naphthoquinone and anthraquinone dyes, the quinone dyes as described in DE-A-3 507 379, the azo dyes as described in U.S. Pat. No. 4,702,945, the N,N,N',N'-tetratris(p-dialkylaminophenyl)-p-phenylenediamines, the porphyrins and the azo complex dyes.

Particularly preferred dyes in connection with the optical recording medium according to the present invention are azulenesquaric acid dyes as mentioned inter alia in DE-A-3 631 843, 3 733 173 and 3 810 642, and silicon naphthalocyanines (DE-A-3 810 956 and DE-A-3 830 041).

To prepare the optical recording medium according to the present invention, a dye solution is made up with a solids:solvent content of from 0.50:99.5 to 6:94 parts, preferably from 2:98 to 4:96 parts. After the dye has been dissolved, dust and other insolubles are separated off in a conventional manner, for example by centrifugation or filtration. The solution is applied to a disk with a commercial laboratory coating machine (for example an instrument from Convac) in layer form, the thickness of the layer being adjustable by the composition of the solution and the speed of rotation of the disk. The layer thickness can be determined with an α-step meter (for example an α-step meter 200 from Tencor) by sensing the depth of a scratch in the layer on a hard substrate, preferably glass, with a fine needle. The homogeneity is checked under an optical microscope (for example at 500-fold or 1,000-fold magnification). The optical properties of the layer are measured with a UV-VIS spectrometer (for example Lambda 5 from Perkin Elmer). The write/read properties are determined with a focused laser beam at a wavelength of 830 nm and a diode laser power output of 0.4 to 10 mW. The detector used is a TAOHS head, NA=0.5 from Olympus. The electromicrographs are recorded with a DSM 950 from Zeiss, Oberkochen.

The novel optical recording media prepared in this way are notable for high stability of the light-absorbing layer, low sensitivity to water, high reflectivity and low background noise.

The present invention is further illustrated by the following examples in comparison with the prior art (parts are by weight):

COMPARATIVE EXAMPLE 1

A dye solution is prepared from 3 parts of the dye of Example 19 of DE-A-3 810 956, except that two further methylene groups have been incorporated between the isooctyl and the SiO group, and 96 parts of cyclohexane. Dust and undissolved particles are removed by filtration. Layer thicknesses of around 100 nm are obtained at speeds of from 700 to /4,000 rpm. The layers are very soft and uneven and after 2 days show fine crystallites over the entire layer.

EXAMPLE 1

A dye solution is prepared from 1.5 parts of the dye of Example 19 of DE-A-3 733 173 and 1.5 parts of polymethylindene of formula I and 97 parts of cyclohexane, the polymethylindene having an average molecular weight of 10,000 (determined by GPC in THF with polystyrene as standard), a glass transition temperature of 280° C. (determined by DSC with a heating-up rate of 20° C./min) and a decomposition temperature >500° C. (according to DSC). After dust has been removed by filtration, the solution is applied by spin coating as described in Comparative Example 1. Layer thicknesses of 100 nm are obtained The layers show no sign of crystallization and remain stable.

COMPARATIVE EXAMPLE 2

A dye solution is prepared from 1.7 parts of the dye of Example 8 of DE-A-3 816 187, 1 part of a p-cresol/formaldehyde condensate and 97.3 parts of 1,1,2-trichloroethane. The p-cresol/formaldehyde condensate has an average molecular weight of 430 (determined by GPC) and a glass transition temperature of 42° C. (determined by DSC at a heating-up rate of 20° C.). After filtration to remove the dust, the solution is applied by spin coating as described in Comparative Example 1. Irradiation with a focused laser beam from a diode laser at 830 nm with a power output of 10 mW produces a hole having flat edges which merge into one another if close together (FIG. 1). On prolonged heating at 80° C. the written pits lose their shape The write sensitivity is limited at low writing speed by pulse crowding.

EXAMPLE 2A

A dye solution is prepared from 1.7 parts of the dye of Example 8 of DE-A-3 816 187, 1 part of polymethylindene of formula I and 97.3 parts of 1,1,2-trichloroethane. The polymethylindene of the formula I has an average molecular weight of 10,000 (determined by GPC in THF with polystyrene as standard), a glass transition temperature of 280° C. (determined by DSC at a heating-up rate of 20° C./min) and a decomposition temperature >500° C. (likewise according to DSC). After filtration to remove any dust, the solution is applied by spin coating as described in Comparative Example 1. Irradiation as described in Comparative Example 2 produces pits having crisp edges which remain separate even if close together (FIG. 2). All in all, the write sensitivity obtained is lower but at the same time pulse crowding is suppressed. The pits remain stable under prolonged heating.

EXAMPLE 2B

A dye solution is prepared from 1.7 parts of the dye of Example 8 of DE-A-3 816 187, 1 part of polymethylindene of formula I and 97.3 parts of 1,1,2-trichloroethane. The polymer has an average molecular weight of 2,500 (determined by GPC in THF with polystyrene as standard), a glass transition temperature of 230° C. (determined by DSC at a heating-up rate of 20° C./min) and a decomposition temperature >500° C. (likewise by DSC). After filtration to remove any dust, the solution is applied by spin coating as described in Comparative Example 1. The write sensitivity is greater than in Example 2 and pulse crowding is less suppressed.

COMPARATIVE EXAMPLE 3

A dye solution is prepared from 2.1 parts of the dye of Example II,16 of DE-A-3 816 187, 0.9 part of a p-n-octylphenol/formaldehyde condensate having a glass transition temperature of 97° C. (measured by DSC with a heating-up rate of 20° C./min) and 97 parts of methylcyclohexane. The filtered solution is applied as described in Comparative Example 1. Smooth flawless and very soft layers are obtained. After 200 hours in the accelerated aging test (80° C., 80% humidity), the originally narrow absorption pattern becomes very broad and flat. The layer has become cloudy and, under the microscope, shows coarse structures of the type produced by crystallization.

EXAMPLE 3A

A dye solution is prepared from 2.1 parts of the dye of Example II,16 of DE-A-3 816 187, 0.9 part of polyacenaphthylene of the formula II and 97 parts of cyclohexene. The glass transition temperature of the polyacenaphthylene is 310° C. (measured by DSC with a heating-up rate of 20° C./min) and the average molecular weight is 9,000 (determined by GPC using polystyrene as standard). The filtered solution is applied as described in Comparative Example 1. The layers are clear and flawless. After 200 hours in the accelerated aging test the absorption band is somewhat sharper and higher and the absorption maximum has shifted to somewhat longer wavelengths. The layers remain clear, but some flaws have appeared in the layer, mainly somewhat lighter spots and large flat areas of unevenness. There is no sign of crystallization.

EXAMPLE 3B

A dye solution is prepared from 1.5 parts of the dye of Example II,16 of DE-A-3,816,187, 1.5 parts of polymethylindene of the formula I and 97 parts of methylcyclohexane. The polymethylindene has an average molecular weight of 2,500 (determined by GPC using polystyrene as standard) and a glass transition temperature of 230° C. (measured by DSC at a heating-up rate of 20° C./min). The layers are smooth and clear. After 200 hours in the accelerated aging test the absorption band had not changed in position or shape, nor decreased in height to any great extent, if at all. The layers are clear and show no sign of crystallization.

COMPARATIVE EXAMPLE 4

A dye solution is prepared from 3 parts of the dye of Example II,16 of DE-A-3 816 187, 2 parts of polystyrene and 95 parts of cyclohexane. The solution is heated, cooled, passed through a filter 0.4 μm in pore size, and applied by spin coating as described in Comparative Example 1. All the layers exhibit round precipitates approximately 5 μm in size and large schlieren in the layer between the precipitates. There are large signal fluctuations on the disk drive, considered to be a cause of high error rates.

EXAMPLE 4

A dye solution is prepared from 3 parts of the dye of Example II,16 of DE-A-3 816 187, 2 parts of polymethylindene of formula I having an average molecular weight of 10,000 (determined by GPC in THF with polystyrene as standard) and a glass transition temperature of 280° C. (determined by DSC at a heating-up rate of 20° C./min) and a decomposition temperature of greater than 500° C. (likewise determined by DSC), and 95 parts of cyclohexane. The solution is used as described in Comparative Example 4. The layers do not show any precipitations. The signal measured by the disk drive is homogeneous.

COMPARATIVE EXAMPLE 5

A dye solution containing 2 parts of the dye of Example II,16 of DE-A-3 816 187, 1 part of a phenol/novolak cocondensate and 97 parts of Solvenon IPP®. The phenol/formaldehyde cocondensate has an average molecular weight of 2,500 (determined by light scattering) and a glass transition temperature of 110° C. (determined by DSC with a heating-up rate of 20° C./min). The filtered solution is applied as described in Comparative Example 1. The layers are cloudy and, examined under the microscope, show that separation has taken place during spin coating. The dye-rich phases show signs of crystallization.

EXAMPLE 5

A dye solution is prepared from 2 parts of the dye of Example II,16 of DE-A-3 816 187, 1 part of polyindene of formula II having an average molecular weight of 13,000 (determined by GPC using polystyrene as standard) and a glass transition temperature of 184° C. (determined by DSC with a heating-up rate of 20° C./min) and 97 parts of cyclohexene. The filtered solution is applied as described in Comparative Example 1. The layers are clear, mechanically very stable and do not show any separation structures or crystallites.

We claim:

1. An optical recording medium consisting essentially of a base material and a light-absorbing layer which contains a thermoplastic binder and at least one dye, wherein the thermoplastic binder is a polycyclic hydrocarbon which has a glass transition temperature Tg of greater than a150° C. and is soluble to more than 3% by weight in an aliphatic or aromatic hydrocarbon and consists to an extent of more than 80% of units of the formula I

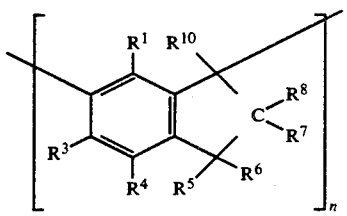

(I)

wherein n is an integer from 10 to 1,000, and $R_1$, $R^3$, $R^4$, $R^5$, $R^6$, $R^7$, $R^8$ and $R^{10}$ are each independently of the others hydrogen or $C_1$–$C_3$-alkyl.

2. An optical recording medium consisting essentially of a base material and a light-absorbing layer which contains a thermoplastic binder and at least one dye, wherein the thermoplastic binder is a polycyclic hydrocarbon which has a glass transition temperature Tg of greater than 150° C. and is soluble to more 3% by weight in an aliphatic or aromatic hydrocarbon and consists of more than 80% of units of the formula II

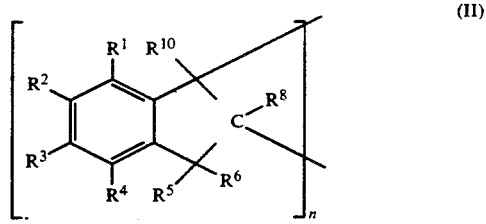

(II)

where n is an integer from 10 to 1,000 and $R_1$, $R^3$, $R^4$, $R^5$, $R^6$, $R^7$, $R^8$ and $R^{10}$ are each independently of the others hydrogen or $C_1$–$C_3$-alkyl.

3. An optical recording medium as claimed in claim 2, wherein, in the general formula II, n is an integer from 10 to 1,000, $R^1$, $R^2$, $R^3$, $R^8$ and $R^{10}$ are each independently of the others hydrogen or $C_1$–$C_3$-alkyl and $R^4$ is (—CH=CH—CH=) which is bonded to the five-membered ring by the terminal double bond in place of $R^5$ and $R^6$.

* * * * *